UNITED STATES PATENT OFFICE.

FREDERICK W. A. FRERICHS, OF ST. LOUIS, MISSOURI.

PROCESS OF MAKING ALKALINE CARBONATES AND ACETONE.

SPECIFICATION forming part of Letters Patent No. 430,734, dated June 24, 1890.

Application filed March 28, 1890. Serial No. 345,754. (No specimens.)

*To all whom it may concern:*

Be it known that I, FREDERICK W. A. FRERICHS, a citizen of the United States, residing at St. Louis, in the State of Missouri, have invented certain new and useful Improvements in the Manufacture of Alkaline Carbonates and Acetone, of which the following is such a full, clear, and exact description as will enable any one skilled in the art to which it appertains to make and use the same.

My invention relates more particularly to the manufacture of carbonate of potassium and acetone.

The manufacture of carbonate of potassium is now generally carried on according to the so-called "Le Blanc process;" but the wear of the furnaces used in its production is considerable and makes the manufacture an expensive one. No valuable by-products are obtained in this process, and hence the price of the article is very high.

My invention is based on the discovery that by a combination of processes, as herein set forth, two valuable substances—carbonate of potassium and acetone—can be produced at the same time in such a way that the total cost of production is borne by the acetone, while at the same time a considerable amount of carbonate of potassium is obtained at little cost.

My process is carried out in the following way: A solution of acetate of lime in water is mixed with a watery solution of sulphate of potassium in equivalent proportion, whereby the following reaction takes place: $(CH_3CO_2)_2Ca + K_2SO_4 = CaSO_4 + 2CH_3CO_2K$. The precipitated sulphate of calcium is filtered off from the solution of acetate of potassium, and the latter is evaporated to dryness, whereby acetate of potassium is yielded. The acetate of potassium is subjected to destructive distillation in a manner similar to the one in which acetate of lime is subjected to destructive distillation in the manufacture of acetone. The following reaction takes place:

$$\begin{matrix}CH_3CO_2K\\CH_3CO_2K\end{matrix} = K_2CO_3 + \begin{matrix}CH_3\\CH_3\end{matrix}\!\!>\!\!CO.$$

It is readily seen from this equation that besides carbonate of potassium an equivalent amount of valuable acetone is obtained.

The output of carbonate of potassium is fully theoretical, and the value of the acetone yielded as a by-product in the manufacture of carbonate of potassium according to my process exceeds considerably the cost of the raw material employed. The excess of value at the now prevalent market price is so large that it will fully cover the cost of manufacture for itself and for carbonate of potassium. The acetate of potassium could also be subjected to distillation, together with anhydride of acetic acid, whereby acetone and carbonate of potassium are produced according to the following formula:

$$\begin{matrix}CH_3COOK\\CH_3COOK\end{matrix} + \begin{matrix}CH_3CO\\CH_3CO\end{matrix}\!\!>\!\!O = K_2CO_3 + CO_2 + 2\begin{matrix}CH_3\\CH_3\end{matrix}\!\!>\!\!CO.$$

It does not deviate from the spirit of my invention if the acetate of potassium be subjected to distillation, together with such organic substances as are adapted to produce acetic acid and which yield by such distillation (in a similar way as anhydride of acetic acid) acetone and at the same time carbonate of potassium. Neither does it deviate from the spirit of my invention if in place of acetate of lime acetate of barium or acetate of strontium be employed. It would also be possible to substitute sulphate of sodium for sulphate of potassium, in which case valuable carbonate of sodium would be obtained.

Having thus described my invention, what I claim, and wish to secure by Letters Patent of the United States, is—

1. The herein-described process for the manufacture of carbonates of alkalies and acetone at one and the same time, which consists in treating acetates of alkaline earths with the sulphate of the desired alkali to make an acetate of such said alkali, and then subjecting such acetate to distillation, substantially as specified.

2. The herein-described process for the manufacture of carbonates of alkalies and acetone at one and the same time, which consists in treating acetates of alkaline earths with the sulphate of the desired alkali to make an acetate of said alkali, and then subjecting such acetate to distillation, together with anhydride of acetic acid.

3. The herein-described process for the manufacture of carbonate of potassium and acetone at one and the same time, which consists in mixing a solution of acetate of lime with a solution of sulphate of potassium to obtain acetate of potassium, and then subjecting the acetate of potassium so obtained to destructive distillation, whereby carbonate of potassium and acetone are formed at one and the same time, for the purpose described.

In testimony whereof I have hereunto set my hand and affixed my seal, this 25th day of March, 1890, in the presence of the two subscribing witnesses.

FRED. W. A. FRERICHS. [L. S.]

Witnesses:
    A. C. FOWLER,
    H. S. REEDER.